March 26, 1940.  A. J. RICE  2,194,811
TRAILER DRIVE
Filed Jan. 22, 1938
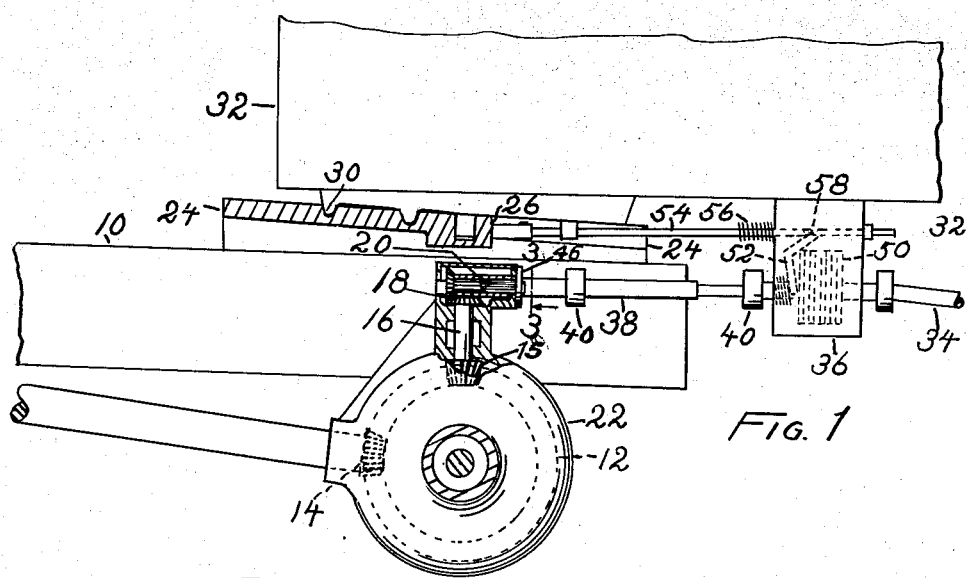
FIG. 1
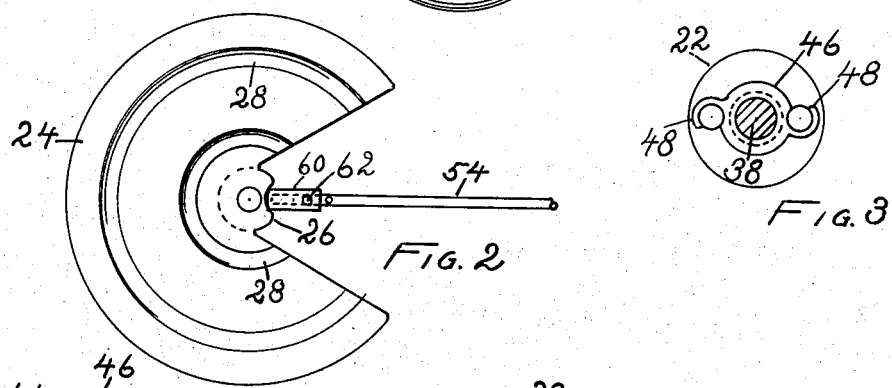
FIG. 2
FIG. 3
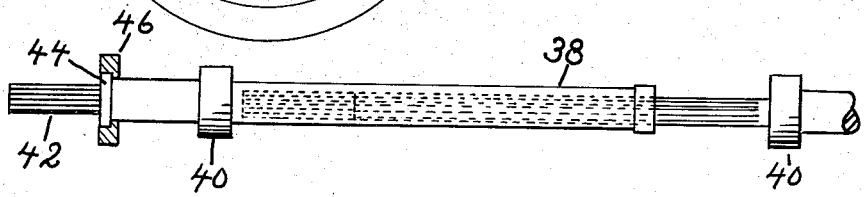
FIG. 4
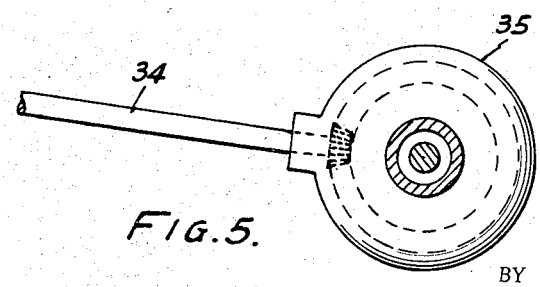
FIG. 5
ALVA J. RICE
INVENTOR.
BY Leon T. Hooper
ATTORNEY.

Patented Mar. 26, 1940

2,194,811

UNITED STATES PATENT OFFICE 2,194,811

TRAILER DRIVE

Alva J. Rice, Hammond, Ind.

Application January 22, 1938, Serial No. 186,341

5 Claims. (Cl. 180—14)

This invention relates to an improved trailer drive for the transmission of power from truck or tractor power plant to a trailer.

One of the principal objects of importance of the improved trailer drive of this invention resides in the provision of means for interrupting the transmission of power when desired or on curves or turns.

Another object of importance and advantage resides in the provision of means for connecting the propeller shaft of the trailer after the trailer is attached to the truck.

An additional object of importance in the improved trailer drive of this invention resides in the provision of means for preventing the propeller shaft from parting or buckling due to slack and takeup between truck and trailer.

Still another important object resides in the provision of means whereby the trailer mechanism may be disconnected and the devices be used as an ordinary trailer.

Additional objects of importance and advantage will become apparent as the following detailed description progresses reference being had to the accompanying drawing wherein Fig. 1 is a side elevational view of a trailer drive, partly in section, which embodies the invention.

Fig. 2 is a top plan view of the circle and a portion of the clutch operating mechanism.

Fig. 3 is a sectional view taken on line 3—3 of Fig. 1, slightly enlarged.

Fig. 4 is a slightly enlarged view of a telescoping propeller shaft and securing member, parts thereof being broken away.

Fig. 5 is an elevational view, partly in section, of a trailer differential mechanism.

As shown in the drawing:

The reference numeral 10 indicates generally the chassis of a truck or tractor. In the accompanying drawing only a fragmental portion of the truck chassis 10 is shown.

In the preferred embodiment of the invention the truck or tractor is provided with a more or less conventional drive gear 12 and pinion 14, which are shown in dotted lines in Fig. 1. A pinion 15 is in operable association with the drive gear 12, and is adapted to transmit power from the drive gear through the pinion shaft 16 and gear train 18 to the propeller shaft receiving member 20. The entire drive gear, pinion and gear train mechanism is incased in a housing 22.

Positioned on the rear end of the truck chassis 10 is a fifth wheel or circle 24. The circle 24 is substantially segmental in plan formation, a portion thereof being cut away as is best shown in Fig. 2. However, it will be apparent that the part may be of any other desired formation.

In the preferred embodiment of the device the peripheral edge of the hub of the circle 24 is slightly indented as is indicated by the reference numeral 26. The indentation 26 forms a cam for operating a clutch through an operating lever. It will be apparent that the clutch operating cam or mechanism may be altered without departing from the scope of the invention. The upper surface of the circle 24 is preferably grooved as is indicated by the reference numeral 28, to provide tracks in which the supporting members 30 of the trailer 32 are positioned.

The trailer 32 is provided with a conventional differential gear mechanism 35 shown in Fig. 5 of the drawing.

Extending forwardly from the trailer differential gear mechanism 35 is a propeller shaft 34. The forward end of the propeller shaft 34 enters and is secured to a clutch housing 36.

Extending forwardly from the clutch housing 36 into the propeller shaft receiving member 20 is a sectional telescoped propeller shaft 38. The telescoped propeller shaft 38 is provided with two universal joints 40, 40. The associated portions of the telescoped propeller shaft 38 are correspondingly fluted as is best shown in Figure 4. This construction allows the propeller shaft to expand or contract longitudinally to take up slack between truck and trailer.

The forward end of the front portion of the telescoped propeller shaft 38 is fluted as at 42 to correspond with the flutes within the propeller shaft receiving member 20. Formed on the forward portion of the propeller shaft 38 is annular shoulder 44.

Positioned on the propeller shaft 38 is a recessed collar 46. The function of the recessed collar is to provide a securing means for maintaining the fluted end 42 of the propeller shaft 38 in engagement with the propeller shaft receiving member 20. The collar 46 is provided with lugs 48 which provide a means for securing the collar to the housing 22 as is best shown in Figure 3. The lugs 48 of the collar 46 are adapted to engage a pair of studs, as is best shown in Fig. 3, to prevent the accidental withdrawal of the fluted end 42 from the shaft receiving member 20. The studs, which engage the lugs 48, are permanently secured to the housing member 22. It will be apparent from the disclosure, that when the collar 46 is in association with the housing 22 one side of the shoulder 44 is in engagement with the end of the shaft receiving member 20 and the other side thereof is in engagement with the collar 46. The shoulder 44 on the shaft 38 therefore prevents longitudinal movement of the fluted end 42 of the shaft in either direction.

Positioned within the clutch casing 36 is a disc clutch 50. It will be obvious that the type of clutch here used may vary to meet any particular requirement or choice. The clutch 50 is provided with an operating yoke 52 which in turn is associated with an operating rod 54. The operating rod 54 extends through the clutch housing 36 and is movable longitudinally therein. Positioned on the operating rod 54 and having contact with the front side of the clutch housing 36 is a coil spring member 56 which normally maintains the operating rod 54 at the forwardmost point of its travel. The portion of the operating rod 54 within the clutch housing is provided with a recess 58 which is normally in engagement with the upper end of the yoke 52. The rearward movement of the rod 54 is adapted to force the upper end of the yoke 52 downwardly thus releasing the clutch.

Positioned on the forward end of the operating rod 54 is an adjustment member 60 which is maintained in sliding engagement with the peripheral surface of the circle 24. The adjustment member 60 provides a means for maintaining the clutch out of engagement when it is so desired. In maintaining the clutch out of engagement the pin 62 is withdrawn and the clutch operating rod 54 is forced rearwardly until the clutch is released and the holes in the member 60 are in alignment with the forwardmost hole in the operating rod 54. The pin 62 is then inserted into the aligned holes. The forward end of the member 60 is thus maintained in constant engagement with the peripheral surface of the circle 24 and the clutch is maintained in disengaged position.

It will be apparent from the foregoing that the turning of the truck, even slightly causes the raised portion of the cam 26 to force the operating rod 54 rearwardly thus releasing the clutch. This construction prevents the assembled truck and trailer from jack-knifing and also prevents the trailer from pushing the rear end of the truck laterally of its direction of travel.

The truck and trailer of this invention are connected in much the same manner as is the ordinary truck and trailer. That is the truck is backed under the forward end of the trailer which is then lowered on to the circle with the king pin in its socket. The shaft 38 is then telescoped sufficiently to allow the fluted end thereof to be entered into the propeller shaft receiving member 20. The shaft is then moved forward until the collar 48 comes into engagement with the housing 20 to which it is secured. The truck and trailer are then ready for use. And driving power supplied to the differential gear mechanism of the truck is also transmitted to the differential gear mechanism of the trailer.

It will be apparent from the foregoing that herein is provided a truck and trailer combination wherein driving power is delivered to the wheels of the trailer as well as to the truck wheels.

Moreover, it will be apparent that a truck and trailer which incorporates the improved trailer drive of this invention may be easily and quickly connected for road use by a single person.

Additionally it will be apparent that the driving mechanism may be disengaged so that the truck and trailer may be used as are conventional trailers.

It will be apparent to those skilled in the art to which the improved trailer drive of this invention appertains that various changes and alterations may be made in the preferred embodiment of the device which is here disclosed, all without departing from the spirit or scope of the invention. Accordingly it is understood that the patent granted hereon is not to be limited except as necessitated by the prior art and the terminology of the appended claims when given the range of equivalents to which they may be entitled.

I claim as my invention:

1. In a power takeoff for operating a trailer in conjunction with a truck, a driven differential gear on said truck, a shaft having a pinion on one end in operable association with said differential gear, a gear train in association with the other end of said shaft and a propeller shaft receiving member, said gear train being adapted to transmit power to said propeller shaft receiving member, a propeller shaft on said trailer, one end of said shaft being removably telescoped within said shaft receiving member the other end of said shaft being associated with the differential mechanism of the trailer, and automatically operated clutch means positioned intermediate the ends of said propeller shaft for disengaging the driving mechanism when the trailer and truck are out of end to end alignment.

2. A trailer adapted to be used with a motor driven vehicle, said trailer having a propeller shaft, the forward end of said propeller shaft being adapted to be secured to a driving member, and an automatically operated friction clutch positioned intermediate the ends of said propeller shaft, said clutch being adapted to automatically disengage the driving mechanism when trailer and source of power are out of end to end alignment.

3. A trailer adapted to be used with a motor driven vehicle, said trailer having a propeller shaft the rear end of which is in operable association with the rear wheels of said trailer, the forward end of said propeller shaft being adapted to be secured to a driving member, and an automatically actuated friction clutch positioned intermediate the ends of said propeller shaft, said clutch being actuated by a rod when motor-driven vehicle and said trailer are out of end to end alignment, and means for increasing or decreasing the length of said clutch actuating rod.

4. In a combination truck and driven trailer assembly, means for interrupting the transmission of power to the trailer on curves or turns, said means comprising clutch and a cam operated rod association with said clutch on one vehicle and a cam adapted to engage said rod on the other vehicle, said rod extending from said clutch to the cam and being movable longitudinally, said cam being concentric to the circle and normally allowing the rod to be at its forwardmost point of travel, and offset portions on the peripheral surface of said cam for moving the rod rearwardly to disengage the clutch when said cam is rotated in either direction.

5. In a truck and driven trailer combination means for transmitting power to the wheels of said trailer, and automatically operated clutch means for completely interrupting said transmission of power when the combination vehicle is negotiating a curve or turn, said last named means including a cam concentrically located on the circle of said truck, said cam being adapted to interrupt the transmission of power when said cam is turned in either direction.

ALVA J. RICE.